US009330230B2

(12) United States Patent
Archer et al.

(10) Patent No.: US 9,330,230 B2
(45) Date of Patent: May 3, 2016

(54) VALIDATING A CABLING TOPOLOGY IN A DISTRIBUTED COMPUTING SYSTEM

(75) Inventors: Charles J. Archer, Rochester, MN (US); Mark G. Megerian, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 11/737,229

(22) Filed: Apr. 19, 2007

(65) Prior Publication Data
US 2008/0259816 A1 Oct. 23, 2008

(51) Int. Cl.
*G06F 15/173* (2006.01)
*G06F 17/50* (2006.01)

(52) U.S. Cl.
CPC .......... *G06F 17/509* (2013.01); *G06F 2217/36* (2013.01); *G06F 2217/74* (2013.01)

(58) Field of Classification Search
CPC .............. G06F 17/509; G06F 2217/74; H04L 12/2697; H04L 41/0893; H04L 43/0811; H04L 43/50
USPC .......................................... 709/220–223, 238
See application file for complete search history.

(56) References Cited

U.S. PATENT DOCUMENTS

| | | | |
|---|---|---|---|
| 4,245,344 A | | 1/1981 | Richter |
| 4,634,110 A | | 1/1987 | Julich et al. |
| 4,860,201 A | | 8/1989 | Stolfo et al. |
| 5,333,268 A | | 7/1994 | Douglas et al. |
| 5,715,391 A | * | 2/1998 | Jackson et al. ................... 712/11 |
| 5,729,756 A | * | 3/1998 | Hayashi ........................... 712/15 |
| 5,821,937 A | * | 10/1998 | Tonelli .................... H04L 41/12  709/225 |
| 5,918,005 A | | 6/1999 | Moreno et al. |
| 5,941,992 A | | 8/1999 | Croslin et al. |
| 5,953,347 A | | 9/1999 | Wong et al. |
| 5,953,530 A | | 9/1999 | Rishi et al. |
| 6,047,122 A | | 4/2000 | Spiller |
| 6,205,532 B1 | * | 3/2001 | Carvey et al. ...................... 712/1 |
| 6,230,252 B1 | * | 5/2001 | Passint et al. ................... 712/12 |

(Continued)

OTHER PUBLICATIONS

N R Adiga et al., "An Overview of the BlueGene/L Supercomputer," Supercomputing, ACM/IEEE 2002 Conference, Nov. 16-22, 2002, Piscataway, NJ.

(Continued)

*Primary Examiner* — Waseem Ashraf
(74) *Attorney, Agent, or Firm* — Nicholas D. Bowman; Feb Cabrasawan

(57) ABSTRACT

Validating a cabling topology in a distributed computing system comprised of cabled nodes connected using data communications cables, each cabled node characterized by cabling dimensions, each cable corresponding to one of the cabling dimensions, includes: receiving a selection from a user of at least one cabled node for topology validation; identifying, for each cabling dimension for each selected cabled node, a shortest cabling path; determining, for each cabling dimension, whether the number of cabled nodes in the shortest cabling path for each selected cabled node match; and if, for each cabling dimension, the number of cabled nodes in the shortest cabling path for each selected cabled node match: selecting, for each cabling dimension, the number of cabled nodes in the shortest cabling path as a representative value for the cabling dimension, calculating a product of the representative values, and determining whether the product equals the number of selected cabled nodes.

18 Claims, 8 Drawing Sheets

(56) References Cited

U.S. PATENT DOCUMENTS

| | | | |
|---|---|---|---|
| 6,449,667 B1 | 9/2002 | Ganmukhi et al. | |
| 6,769,056 B2 * | 7/2004 | Barry et al. | 712/15 |
| 6,813,240 B1 | 11/2004 | Shah | |
| 6,848,062 B1 | 1/2005 | Desai et al. | |
| 6,880,100 B2 | 4/2005 | Mora et al. | |
| 6,892,329 B2 | 5/2005 | Bruckman | |
| 6,912,196 B1 | 6/2005 | Mahalingaiah | |
| 7,007,189 B2 | 2/2006 | Lee et al. | |
| 7,027,413 B2 * | 4/2006 | Lee | G06F 15/17337 370/255 |
| 7,028,225 B2 | 4/2006 | Maso et al. | |
| 7,080,156 B2 | 7/2006 | Lee et al. | |
| 7,149,920 B2 | 12/2006 | Blumrich et al. | |
| 7,200,118 B2 | 4/2007 | Bender et al. | |
| 7,210,088 B2 | 4/2007 | Chen et al. | |
| 7,289,428 B2 | 10/2007 | Chow | |
| 7,382,734 B2 | 6/2008 | Wakumoto et al. | |
| 7,451,340 B2 | 11/2008 | Doshi et al. | |
| 7,461,236 B1 | 12/2008 | Wentzlaff | |
| 7,505,414 B2 * | 3/2009 | Nakashima et al. | 370/238 |
| 7,506,197 B2 | 3/2009 | Archer et al. | |
| 7,529,963 B2 * | 5/2009 | Archer et al. | 714/4 |
| 7,571,345 B2 | 8/2009 | Archer et al. | |
| 7,600,095 B2 | 10/2009 | Archer et al. | |
| 7,646,721 B2 | 1/2010 | Archer et al. | |
| 7,669,075 B2 | 2/2010 | Archer et al. | |
| 7,890,543 B2 * | 2/2011 | Hunt | G06F 9/4433 707/803 |
| 8,085,802 B1 * | 12/2011 | Monk | H04L 5/0046 370/419 |
| 2002/0009085 A1 * | 1/2002 | Barkai et al. | 370/395.1 |
| 2002/0042274 A1 * | 4/2002 | Ades | H04L 41/0806 455/445 |
| 2002/0152432 A1 | 10/2002 | Fleming | |
| 2002/0188930 A1 | 12/2002 | Moser et al. | |
| 2003/0046427 A1 * | 3/2003 | Goringe et al. | 709/242 |
| 2003/0055932 A1 * | 3/2003 | Brisse | H04L 29/06 709/223 |
| 2003/0061265 A1 | 3/2003 | Maso et al. | |
| 2004/0078493 A1 | 4/2004 | Blumrich et al. | |
| 2004/0090925 A1 * | 5/2004 | Schoeberl et al. | 370/254 |
| 2004/0103218 A1 * | 5/2004 | Blumrich et al. | 709/249 |
| 2004/0153754 A1 * | 8/2004 | Chen et al. | 714/13 |
| 2004/0181707 A1 | 9/2004 | Fujibayashi | |
| 2004/0205237 A1 | 10/2004 | Doshi et al. | |
| 2004/0208559 A1 * | 10/2004 | Krishnaswamy | H04B 10/275 398/59 |
| 2004/0223463 A1 | 11/2004 | MacKiewich et al. | |
| 2005/0041600 A1 * | 2/2005 | Moffatt et al. | 370/254 |
| 2005/0095008 A1 * | 5/2005 | DeCusatis et al. | 398/164 |
| 2005/0120273 A1 | 6/2005 | Hudson et al. | |
| 2005/0131865 A1 | 6/2005 | Jones et al. | |
| 2005/0132163 A1 * | 6/2005 | Stockmeyer | 712/11 |
| 2005/0152305 A1 * | 7/2005 | Ji | H04L 45/54 370/328 |
| 2005/0246569 A1 | 11/2005 | Ballew et al. | |
| 2005/0259587 A1 | 11/2005 | Wakumoto et al. | |
| 2006/0023639 A1 * | 2/2006 | Bohannon et al. | 370/254 |
| 2006/0101104 A1 * | 5/2006 | Bhanot | G06F 9/5066 708/105 |
| 2006/0143587 A1 * | 6/2006 | Boutin | G06F 17/509 716/119 |
| 2006/0179269 A1 | 8/2006 | Archer et al. | |
| 2006/0190587 A1 * | 8/2006 | Sylvest | H04L 41/12 709/223 |
| 2007/0174558 A1 | 7/2007 | Jia et al. | |
| 2007/0245122 A1 | 10/2007 | Archer et al. | |
| 2008/0143379 A1 * | 6/2008 | Norman | H01L 23/50 326/39 |
| 2008/0253386 A1 | 10/2008 | Barum | |
| 2008/0263320 A1 | 10/2008 | Archer et al. | |
| 2008/0263329 A1 | 10/2008 | Archer et al. | |
| 2008/0263387 A1 | 10/2008 | Darrington et al. | |
| 2008/0270998 A1 | 10/2008 | Zambrana | |
| 2008/0313506 A1 | 12/2008 | Archer et al. | |
| 2009/0016332 A1 | 1/2009 | Aoki et al. | |

OTHER PUBLICATIONS

Office Action Dated Nov. 12, 2008 in U.S. Appl. No. 11/279,573.
Office Action Dated Apr. 15, 2009 in U.S. Appl. No. 11/279,573.
Office Action Dated Nov. 12, 2008 in U.S. Appl. No. 11/279,579.
Office Action Dated Apr. 15, 2009 in U.S. Appl. No. 11/279,579.
Office Action Dated Jan. 9, 2009 in U.S. Appl. No. 11/279,586.
Office Action Dated Nov. 18, 2008 in U.S. Appl. No. 11/279,592.
Office Action Dated Apr. 29, 2009 in U.S. Appl. No. 11/279,592.
U.S. Appl. No. 11/279,573, filed Oct. 18, 2007, Archer, et al.
U.S. Appl. No. 11/360,346, filed Oct. 4, 2007, Gooding, et al.
U.S. Appl. No. 11/279,579, filed Nov. 8, 2007, Archer, et al.
U.S. Appl. No. 11/279,586, filed Oct. 18, 2007, Archer, et al.
U.S. Appl. No. 11/279,592, filed Oct. 18, 2007, Archer.
U.S. Appl. No. 11/737,229, filed Oct. 23, 2008, Archer, et al.
U.S. Appl. No. 11/832,940, filed Feb. 5, 2009, Archer, et al.
Final Office Action Dated Oct. 28, 2009 in U.S. Appl. No. 11/279,573.
Final Office Action Dated Sep. 4, 2009 in U.S. Appl. No. 11/279,579.
Notice of Allowance Dated Nov. 2, 2009 in U.S. Appl. No. 11/279,592.
Office Action Dated Mar. 8, 2010 in U.S. Appl. No. 11/360,346.
Notice of Allowance Dated Jun. 30, 2009 in U.S. Appl. No. 11/279,586.
Office Action Dated Mar. 29, 2010 in U.S. Appl. No. 11/832,940.
Stallman, Richard M. GDB Manual—The GNU Source-Level Debugger. [online] (Oct. 1989). Free Software Foundation, Inc., pp. 1-78. Retrieved From the Internet <http://www.cs.cmu.edu/afs/cs/usr/bovik/OldFiles/vax_u13/omega/usr/mach/doc/gdb.ps>.
Final Office Action, U.S. Appl. No. 11/360,346, Jul. 23, 2010.
Office Action, U.S. Appl. No. 11/737,229, Oct. 6, 2010.
Final Office Action, U.S. Appl. No. 11/360,346, Oct. 7, 2011.
Final Office Action, U.S. Appl. No. 11/737,229, Feb. 16, 2011.
Advisory Action, U.S. Appl. No. 11/737,229, Apr. 27, 2011.
Final Office Action, U.S. Appl. No. 11/360,346, Mar. 22, 2012.

* cited by examiner

VALIDATING A CABLING TOPOLOGY IN A DISTRIBUTED COMPUTING SYSTEM

BACKGROUND OF THE INVENTION

1. Field of the Invention

The field of the invention is data processing, or, more specifically, methods, apparatus, and products for validating a cabling topology in a distributed computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Distributed computing is an area of computer technology that has experienced such advances. Distributed computing is the execution of a task (split up and specially adapted) on multiple processors in order to obtain results faster. Distributed computing is based on the fact that the process of solving a problem usually can be divided into smaller tasks, which may be carried out simultaneously with some coordination. A distributed computing system, therefore, is a computing system that uses two or more network connected computing devices to accomplish a common task. Such computing devices may be implemented as stand-alone computers, blade servers installed in a server chassis, compute nodes installed in a mid-plane of a parallel computer, or any other computing device.

Regardless of their implementation, at some level, computing devices are typically connected in the distributed computing system through circuit board traces and connectors or using data communication cables. When the computing devices are implemented as stand-alone computers, each computer is connected to the other computing devices using cables and none of the computers are connected together using circuit board traces and connectors. When the computing devices are implemented as blade servers installed in multiple server chassis, the blade servers are typically connected intra-chassis through circuit board traces and connectors, while inter-chassis connections occur using cables. Similarly, when computing devices are implemented as compute nodes installed in a mid-plane of a parallel computer, the compute nodes are typically connected intra-mid-plane through circuit board traces and connectors, while the inter-mid-plane connections occur using cables. These units that are connected by cables, whether each unit is a stand-along computer, a blade server chassis, or a mid-plane of a parallel computer, are referred to as 'cabled nodes.' That is, cabled nodes of a distributed computing system are apparatus connected by cables for data communication. A cabled node, therefore, may be implemented using a stand-alone computer, a blade server chassis, or a mid-plane of a parallel computer.

As mentioned above, a distributed computing system is a computing system that uses two or more network connected computing devices to accomplish a common task. Typically, the common task of a distributed computing system is to run a distributed software application. Portions of the distributed software application run on each computing device in the distributed computing system simultaneously. The portion of the distributed software application being executed at any one moment in the distributed computing system may be identical across all the computing devices. However, different computing devices may also be executing different portions of the distributed software application at any one moment.

As each computing device processes a portion of the distributed application software, there are generally two ways that the computing devices may communicate, shared memory or message passing. Shared memory processing needs additional locking for the data and imposes the overhead of additional processor and bus cycles and also serializes some portions of the application.

Message passing processing uses high-speed data communications networks and message buffers to effect communication, but this communication adds transfer overhead on the data communications networks as well as additional memory need for message buffers and latency in the data communications among computing devices. Designs of distributed computing systems use specially designed data communications links so that the communication overhead will be small but it is the distributed software application that dictates the volume of the traffic.

Many data communications network topologies are used for message passing among computing devices in distributed computing systems. Typically, message passing requires computing devices be organized in a network topology such as 'torus' or 'rectangular mesh,' for example, to effect point-to-point communication among computing devices. A torus network topology connects the computing devices in a multi-dimensional mesh with wrap around links in each dimension. For example, a torus network topology may connect the computing devices in a three-dimensional mesh. In such a torus network topology, every computing device, therefore, is connected to its six neighbors, and each computing device is addressed by its x, y, and z coordinates in the mesh. A rectangular mesh network topology is similar to a torus network topology, but the connections in a rectangular mesh network topology do not wrap around in all dimensions. All computing devices can still communication with each other, but performance is less than optimal since messages from computing devices near the edges have to traverse many intervening computing devices to reach a computing device on the other edge of the mesh. In distributed software applications that do not require extensive point-to-point data communications, the less than optimal performance of a rectangular mesh topology may be satisfactory in light of the increased complexity in the physical hardware typically required to implement a torus topology.

Regardless of the network topology used for data communications in a distributed computing system, the cabling topology must match a user's desired network topology. Consider, for example, that a user selects various blade servers of a distributed computing system on which to operate the user's distributed software application. Further consider that the blade servers are installed in multiple blade server chassis. If a distributed software application requires a torus network topology for data communications among blade servers, then the cables between multiple server blade chassis must also be configured in a torus topology to effect inter-chassis data communication suitable for the application. Because system architects rarely modify the arrangement of the physical cables between cabled nodes in a distributed computing system, users of the distributed computing system must carefully choose particular cabled nodes within a fixed cabling scheme that provide the proper cabling topology. That is, by choosing particular cabling nodes in the distributed computing system that participate in processing the user's distributed software application, the user may obtain the desire cabling topology, and therefore, the desired communications network topology.

SUMMARY OF THE INVENTION

Methods, apparatus, and products are disclosed for validating a cabling topology in a distributed computing system, the distributed computing system comprised of a plurality of cabled nodes connected for data communications using a plurality of cables, each cabled node of the distributed computing system characterized by a plurality of cabling dimensions, each cable corresponding to one of the cabling dimensions. Validating a cabling topology in a distributed computing system includes: receiving, in a topology validation module from a user, a selection of at least one of the cabled nodes for topology validation; identifying, by the topology validation module for each cabling dimension for each selected cabled node, a shortest cabling path that includes the selected cabled nodes capable of connecting to the selected cabled node in the cabling dimension; determining, by the topology validation module for each cabling dimension, whether the number of cabled nodes in the shortest cabling path for each selected cabled node match; and if, for each cabling dimension, the number of cabled nodes in the shortest cabling path for each selected cabled node match: selecting, by the topology validation module for each cabling dimension, the number of cabled nodes in the shortest cabling path for the cabling dimension as a representative cabling dimension value for the cabling dimension, calculating, by the topology validation module, a product of the representative cabling dimension values for the cabling dimensions, and determining, by the topology validation module, whether the product of the representative cabling dimension values for the cabling dimensions equals the number of selected cabled nodes for topology validation.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
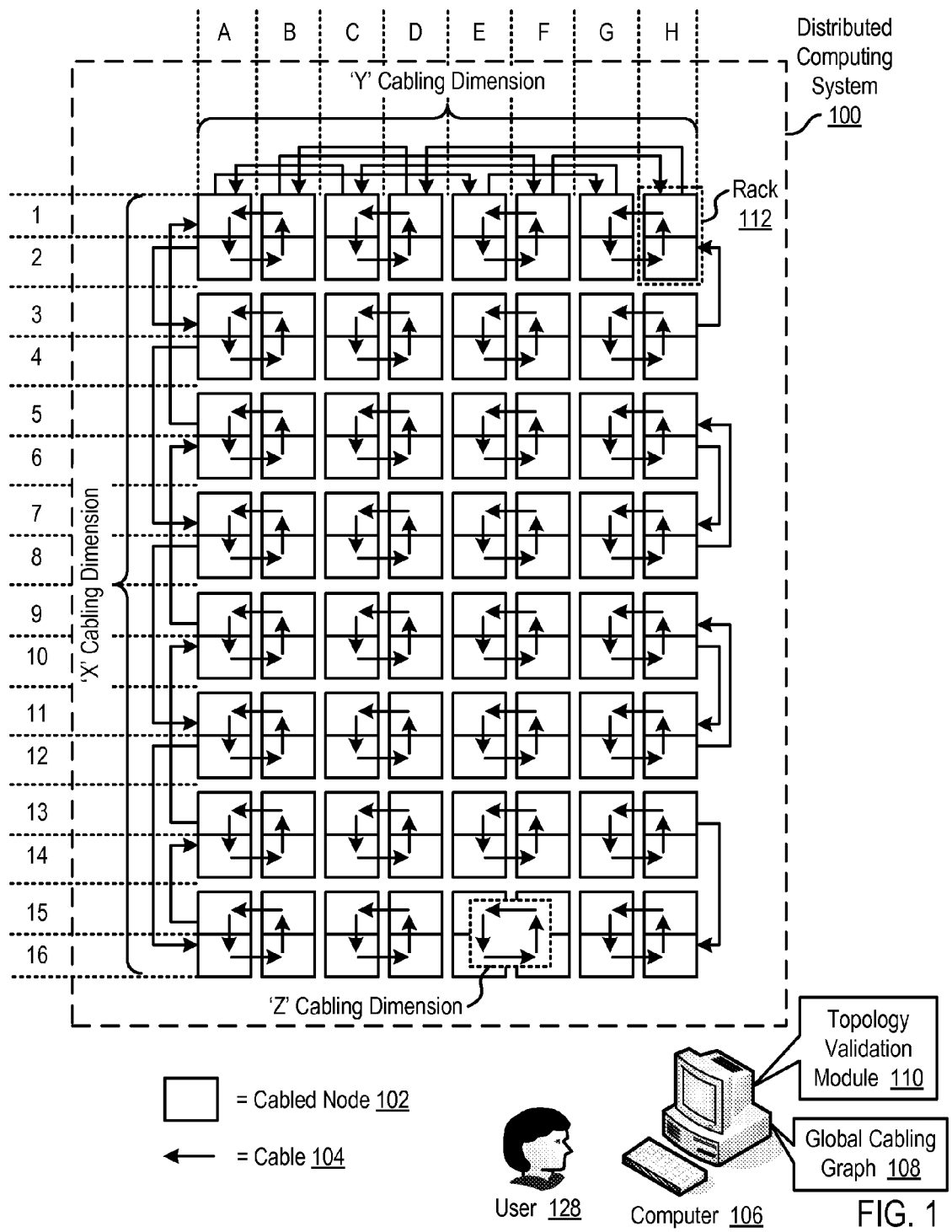
FIG. 1 sets forth a line drawing illustrating an exemplary system for validating a cabling topology in a distributed computing system according to embodiments of the present invention.

Exemplary methods, apparatus, and computer program products for validating a cabling topology in a distributed computing system according to embodiments of the present invention are described with reference to the accompanying drawings, beginning with FIG. 1. FIG. 1 sets forth a line drawing illustrating an exemplary system for validating a cabling topology in a distributed computing system (100) according to embodiments of the present invention. The distributed computing system (100) of FIG. 1 includes a plurality of cabled nodes (102) connected for data communications using a plurality of unidirectional cables (104). Each cabled node (102) in the exemplary system of FIG. 1 is implemented as a mid-plane in a parallel computer such as for example, IBM's BlueGene/L supercomputer, where each mid-plane is comprised of 512 compute nodes for processing distributed software applications. Readers will note that implementing a cabled node as a mid-plane of a parallel computer is for explanation and not for limitation. As mentioned above, a cabled node may be implemented as a stand-alone computer, blade server chassis, or any other computing device or set of computing devices connected to another computing device or set of computing devices using a data communication cable.

In the exemplary distributing computing system (100) of FIG. 1, two cabled nodes (102) are combined in a single rack (112), one cabled node (102) on installed in the rack (112) on top of the other cabled node (102). The distributed computing system (100) of FIG. 1, therefore, is made up of sixty-four racks (112), or 128 cabled nodes (102). Readers will note that the number of cabled nodes in the exemplary distributed computing system (100) is for explanation and not for limitation. In fact, a distributed computing system may include any number of cabled nodes comprised of any number of computing devices.

Each cabled node (102) of the distributed computing system (100) of FIG. 1 is characterized by a plurality of cabling dimensions. In the exemplary system of FIG. 1, the cabling dimensions are 'X,' 'Y,' and 'Z.' Each cable (104) that connects two cabled nodes (102) corresponds to one of the cabling dimensions 'X,' 'Y,' or 'Z.' In the exemplary system of FIG. 1, cables (104) corresponding to the 'X' cabling dimension unidirectionally connect two cabled nodes (102), each cabled node (102) installed in separate racks (112), each rack (112) in a different row of racks (112). For example, the cable (104) connecting cabled node 'A5' to cabled node 'A1' corresponds to the 'X' cabling dimension, the cable (104) connecting cabled node 'A2' to cabled node 'A3' corresponds to the 'X' cabling dimension, the cable (104) connecting cabled node 'H3' to cabled node 'H2' corresponds to the 'X' cabling dimension, and so on. Readers will note that many of the cables corresponding to the 'X' cabling dimension used to connect cabled nodes (102) are omitted for clarity. In fact, the cables (104) corresponding to the 'X' cabling dimension and illustrated among the cabled nodes in columns 'A' and 'H' of FIG. 1 actually occur for each column of cabled nodes (102) in the distributed computing system (100) of FIG. 1.

In the exemplary system of FIG. 1, cables (104) corresponding to the 'Y' cabling dimension unidirectionally connect two cabled nodes (102), each cabled node (102) installed in separate, non-adjacent racks (112), each rack (112) in the same row of racks (112). For example, the cable (104) connecting cabled node 'A1' to cabled node 'E1' corresponds to the 'Y' cabling dimension, the cable (104) connecting cabled node 'E1' to cabled node 'G1' corresponds to the 'Y' cabling dimension, the cable (104) connecting cabled node 'G1' to cabled node 'C1' corresponds to the 'Y' cabling dimension, and so on. Readers will note that many of the cables corresponding to the 'Y' cabling dimension used to connect cabled nodes (102) are omitted for clarity. In fact, the cables (104) corresponding to the 'Y' cabling dimension and illustrated among the cabled nodes in row '1' of FIG. 1 actually occur for each row of cabled nodes (102) in the distributed computing system (100) of FIG. 1.

In the exemplary system of FIG. 1, cables (104) corresponding to the 'Z' cabling dimension unidirectionally connect two adjacent cabled nodes (102), each cabled node (102) installed in the same rack (112) or an adjacent racks (112). For example, the cable (104) connecting cabled node 'A1' to cabled node 'A2' corresponds to the 'Z' cabling dimension, the cable (104) connecting cabled node 'A2' to cabled node 'B2' corresponds to the 'Z' cabling dimension, the cable (104) connecting cabled node 'B2' to cabled node 'B1' corresponds to the 'Z' cabling dimension, the cable (104) connecting cabled node 'B1' to cabled node 'A1' corresponds to the 'Z' cabling dimension, and so on.

The exemplary system of FIG. 1 includes a computer (106) having installed upon it a global cabling graph (108) and a topology validation module (110). The global cabling graph (108) of FIG. 1 is a data structure that models the cabling topology of the entire distributed computing system (100). The global cabling graph (108) of FIG. 1 may be implemented using tables of database, text files, markup language documents specified using the Graph Description Language ('GDL') or the eXtensible Graph Markup and Modeling Language ('XGMML'), and so on. For example, consider the following exemplary global cabling graph implemented as a markup language document specified using the GDL:

```
graph: { //Global Cabling Graph
    node: {title: "A1"}
    node: {title: "A2"}
    node: {title: "A3"}
    . . .
    node: {title: "H14"}
    node: {title: "H15"}
    node: {title: "H16"}
    edge: {source: "A2" target: "A3" dim: "X"}
    edge: {source: "A4" target: "A7" dim: "X"}
    edge: {source: "A8" target: "A11" dim: "X"}
    . . .
    edge: {source: "A1" target: "E1" dim: "Y"}
    edge: {source: "E1" target: "G1" dim: "Y"}
    edge: {source: "G1" target: "C1" dim: "Y"}
    . . .
    edge: {source: "A1" target: "A2" dim: "Z"}
    edge: {source: "A2" target: "B2" dim: "Z"}
    edge: {source: "B2" target: "B1" dim: "Z"}
    . . .
}
```

The exemplary global cabling graph above fully specifies the cabling topology of the exemplary distributed computing system (100) of FIG. 1. Each cabled node (102) of the exemplary distributed computing system (100) is represented by a GDL 'node' element. Each cable (104) of the exemplary distributed computing system (100) is represented by a GDL 'edge' element. For example, GDL element 'edge: {source: "A2" target: "A3" dim: "X"}' specifies that unidirectional cable connects cabled node 'A2' to cabled node 'A3' and that the specified cable corresponds to the 'X' cabling dimension.

The exemplary computer (106) of FIG. 1 also has installed upon it a topology validation module (110). The topology validation module (110) of FIG. 1 is software component that includes a set of computer program instructions for validating a cabling topology in a distributed computing system according to embodiments of the present invention. The topology validation module (110) of FIG. 1 operates generally for validating a cabling topology in a distributed computing system according to embodiments of the present invention by: receiving, from a user (128), a selection of at least one of the cabled nodes for topology validation; identifying, for each cabling dimension for each selected cabled node, a shortest cabling path that includes the selected cabled nodes; determining whether the number of cabled nodes in the shortest cabling path for each cabling dimension for each selected cabled node match; and if the numbers of cabled nodes in the shortest cabling path for each cabling dimension for each selected cabled node match: selecting, for each cabling dimension, the number of cabled nodes in the shortest cabling path for the cabling dimension as a representative cabling dimension value for the cabling dimension, calculating a product of the representative cabling dimension values for the cabling dimensions, and determining whether the product of the representative cabling dimension values for the cabling dimensions equals the number of selected cabled nodes for topology validation.

The topology validation module (110) of FIG. 1 may also operate generally for validating a cabling topology in a distributed computing system according to embodiments of the present invention by notifying the user (128) that the selected cabled nodes satisfy the cabling topology if the product of the representative cabling dimension values for the cabling dimensions equals the number of selected cabled nodes for topology validation. Still further, the topology validation module (110) of FIG. 1 may operate generally for validating a cabling topology in a distributed computing system according to embodiments of the present invention by notifying the user (128) that the selected cabled nodes do not satisfy the cabling topology if the product of the representative cabling dimension values for the cabling dimensions does not equal the number of selected cabled nodes for topology validation.

In the exemplary system of FIG. 1, when the user (128) selects one or more cabled nodes (102) for topology validation, the topology validation module (110) of FIG. 1 may use a preprogrammed cabling topology to determine whether the selected cabled nodes provide such a cabling topology. In other embodiments, however, the topology validation module (110) of FIG. 1 may operate generally for validating a cabling topology in a distributed computing system according to embodiments of the present invention by receiving a topology selection from the user (128) for validating a rectangular mesh topology or a torus topology. Receiving a topology selection from the user (128) advantageously allows the topology validation module (110) to validate a cabling topology in a distributed computing system based on a user's preference.

Figure 2:
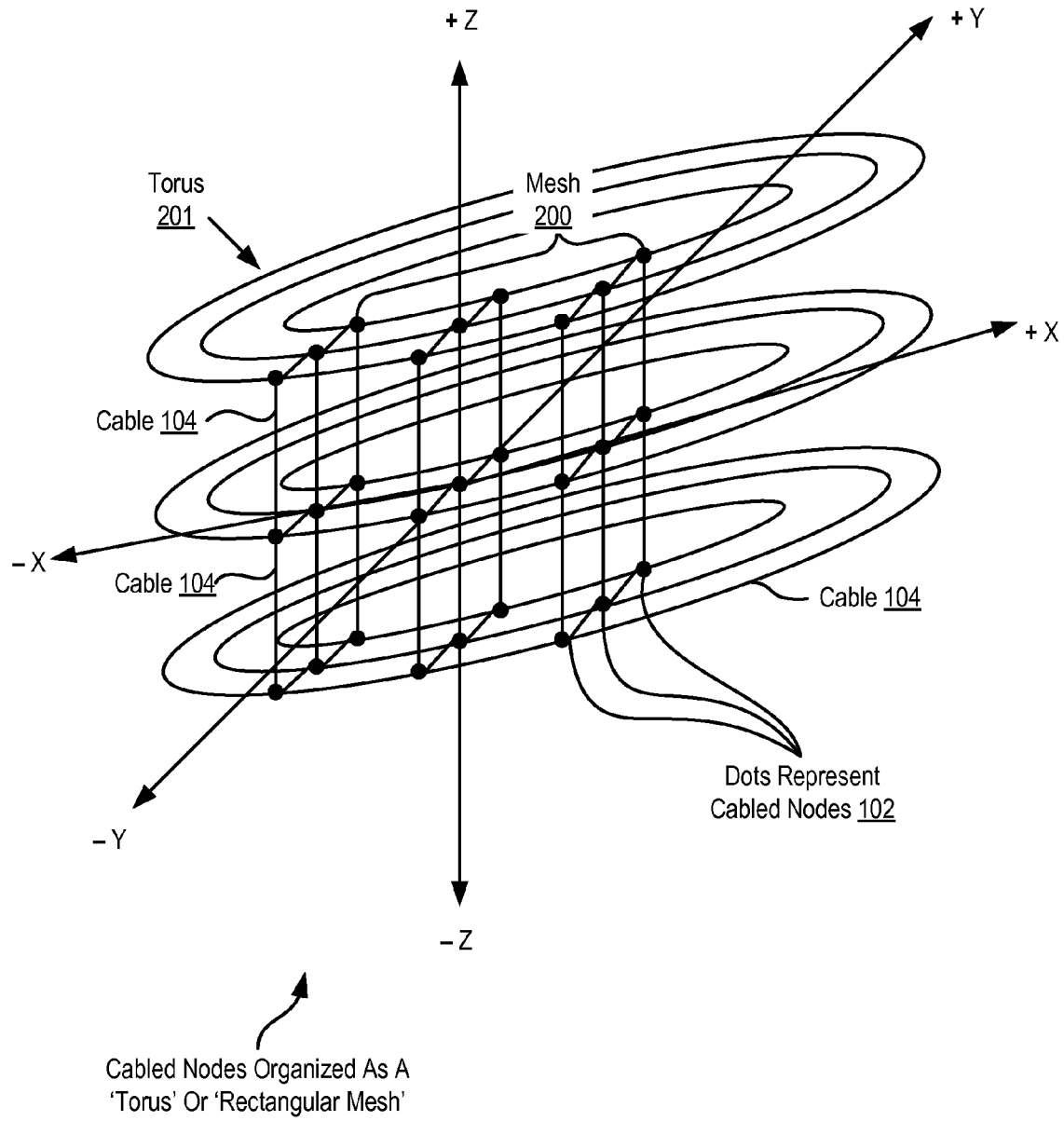
FIG. 2 sets forth a line drawing illustrating an exemplary rectangular mesh topology and torus topology useful in validating a cabling topology in a distributed computing system according to embodiments of the present invention.

For further explanation, FIG. 2 sets forth a line drawing illustrating an exemplary rectangular mesh topology and torus topology useful in validating a cabling topology in a distributed computing system according to embodiments of the present invention. In the example of FIG. 2, dots represent cabled nodes (102) of a distributed computing system, and the lines between the dots represent cables (104) between cabled nodes (102). The rectangular mesh topology (200) is implemented using cables (104) that each connects two adjacent cabled nodes (102) to form a rectangular mesh. The torus topology (201) is adapted from the rectangular mesh topology (200) by adding cables (104) that wrap around from the outer-most cabled nodes (102) of the mesh to connect cabled nodes (102) on opposite sides of the mesh (200). For clarity, only the wrap-around cables (104) for the 'X' cabling dimension are illustrated in FIG. 2. Readers will note, however, that similar wrap-around cables also exist in the 'Y' cabling dimension and the 'Z' cabling dimension. For clarity of explanation, the distributing computing system of FIG. 2 is illustrated with only twenty-seven cabled nodes, but readers will recognize that a distributing computing system in accordance with embodiments of the present invention may contain any number of cabled nodes connected in any number of dimensions.

Validating a cabling topology in a distributed computing system in accordance with the present invention in some embodiments may be implemented with one or more computers, that is, automated computer machinery. For further explanation, therefore, FIG. 3 sets forth a block diagram of automated computing machinery comprising an exemplary computer (106) useful in validating a cabling topology in a distributed computing system according to embodiments of the present invention. The computer (106) of FIG. 3 includes at least one computer processor (208) or 'CPU' as well as random access memory (232) ('RAM') which is connected through a high speed memory bus (210) and bus adapter (214) to processor (208) and to other components of the computer (106).

Figure 3:
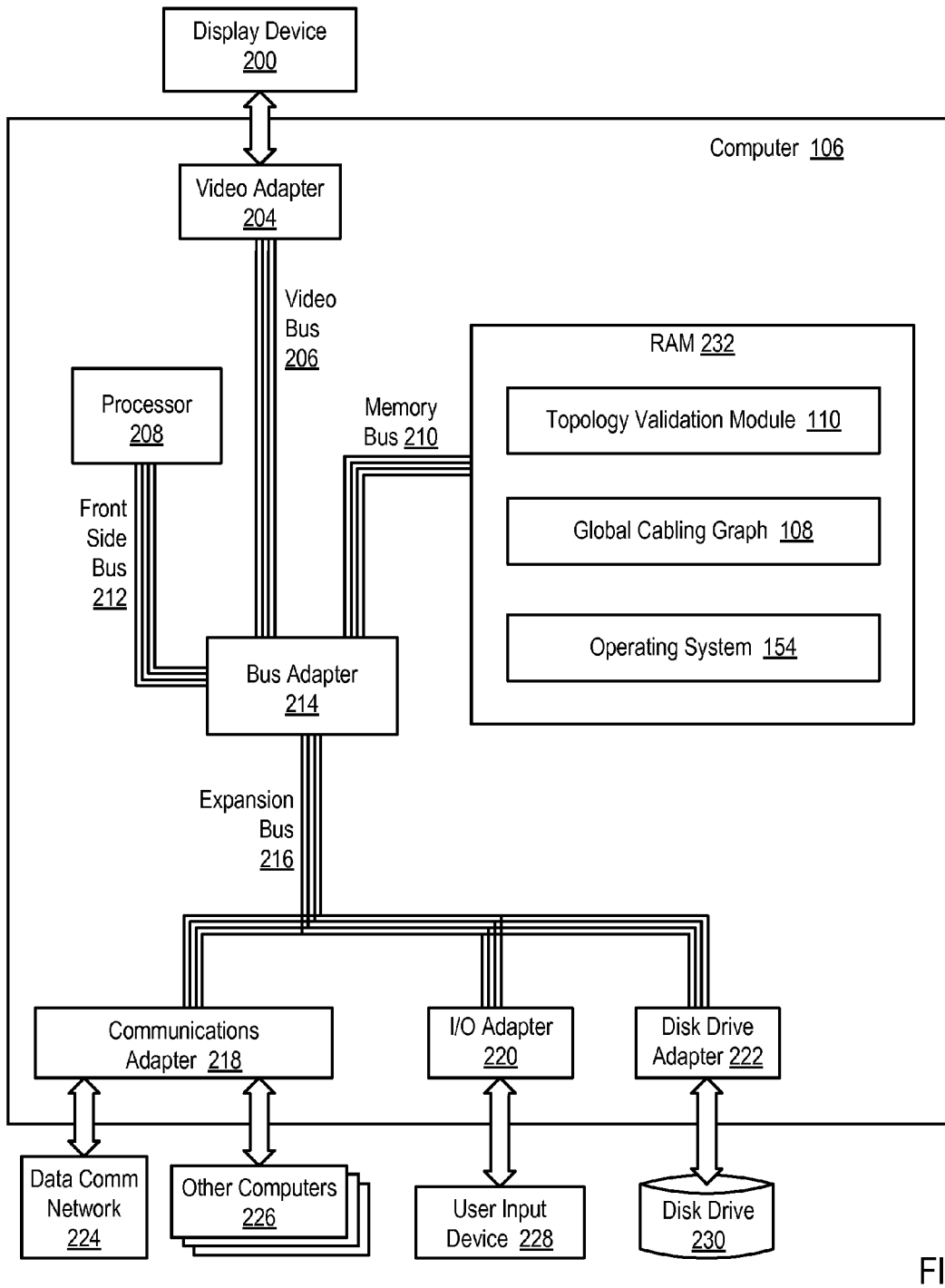
FIG. 3 sets forth a block diagram of automated computing machinery comprising an exemplary computer useful in validating a cabling topology in a distributed computing system according to embodiments of the present invention.

Stored in RAM (232) are a topology validation module (110) and a global cabling graph (108). The global cabling graph (108) of FIG. 3 is a data structure that models the cabling topology of an entire distributed computing system (100). The topology validation module (110) of FIG. 3 is software component that includes a set of computer program instructions for validating a cabling topology in a distributed computing system according to embodiments of the present invention. The topology validation module (110) of FIG. 3 operates generally for validating a cabling topology in a distributed computing system according to embodiments of the present invention as described above with reference to FIG. 1.

Also stored in RAM (232) is an operating system (154). Operating systems useful in computers according to embodiments of the present invention include UNIX™, Linux™, Microsoft XP™, IBM's AIX™, IBM's i5/OS™, and others as will occur to those of skill in the art. The operating system (154), the topology validation module (110), and the global cabling graph (108) in the example of FIG. 3 are shown in RAM (232), but many components of such software typically are stored in non-volatile memory also, for example, on a disk drive (230).

The exemplary computer (106) of FIG. 3 includes bus adapter (214), a computer hardware component that contains drive electronics for high speed buses, the front side bus (212), the video bus (206), and the memory bus (210), as well as drive electronics for the slower expansion bus (216). Examples of bus adapters useful in computers useful according to embodiments of the present invention include the Intel Northbridge, the Intel Memory Controller Hub, the Intel Southbridge, and the Intel I/O Controller Hub. Examples of expansion buses useful in computers useful according to embodiments of the present invention may include Peripheral Component Interconnect ('PCI') buses and PCI Express ('PCIe') buses.

The exemplary computer (106) of FIG. 3 also includes disk drive adapter (222) coupled through expansion bus (216) and bus adapter (214) to processor (208) and other components of the exemplary computer (106). Disk drive adapter (222) connects non-volatile data storage to the exemplary computer (106) in the form of disk drive (230). Disk drive adapters useful in computers include Integrated Drive Electronics ('IDE') adapters, Small Computer System Interface ('SCSI') adapters, and others as will occur to those of skill in the art. In addition, non-volatile computer memory may be implemented for a computer as an optical disk drive, electrically erasable programmable read-only memory (so-called 'EEPROM' or 'Flash' memory), RAM drives, and so on, as will occur to those of skill in the art.

The exemplary computer (106) of FIG. 3 includes one or more input/output ('I/O') adapters (220). I/O adapters in computers implement user-oriented input/output through, for example, software drivers and computer hardware for controlling output to display devices such as computer display screens, as well as user input from user input devices (228) such as keyboards and mice. The exemplary computer (106) of FIG. 3 includes a video adapter (204), which is an example of an I/O adapter specially designed for graphic output to a display device (200) such as a display screen or computer monitor. Video adapter (204) is connected to processor (208) through a high speed video bus (206), bus adapter (214), and the front side bus (212), which is also a high speed bus.

The exemplary computer (106) of FIG. 3 includes a communications adapter (218) for data communications with other computers (226) and for data communications with a data communications network (224). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for validating a cabling topology in a distributed computing system according to embodiments of the present invention include modems for wired dial-up communications, IEEE 802.3 Ethernet adapters for wired data communications network communications, and IEEE 802.11b adapters for wireless data communications network communications.

As mentioned above, a topology validation module operates generally for validating a cabling topology in a distributed computing system according to embodiments of the present invention by receiving a selection from a user of at least one of the cabled nodes in distributed computing system for topology validation. For further explanation, FIG. 4 sets forth a line drawing of a topology validation graphical user interface ('GUI') (400) useful in validating a cabling topology in a distributed computing system according to embodiments of the present invention. A topology validation module may provide the topology validation GUI (400) to receive a selection from a user of the cabled nodes for topology validation.

Figure 4:
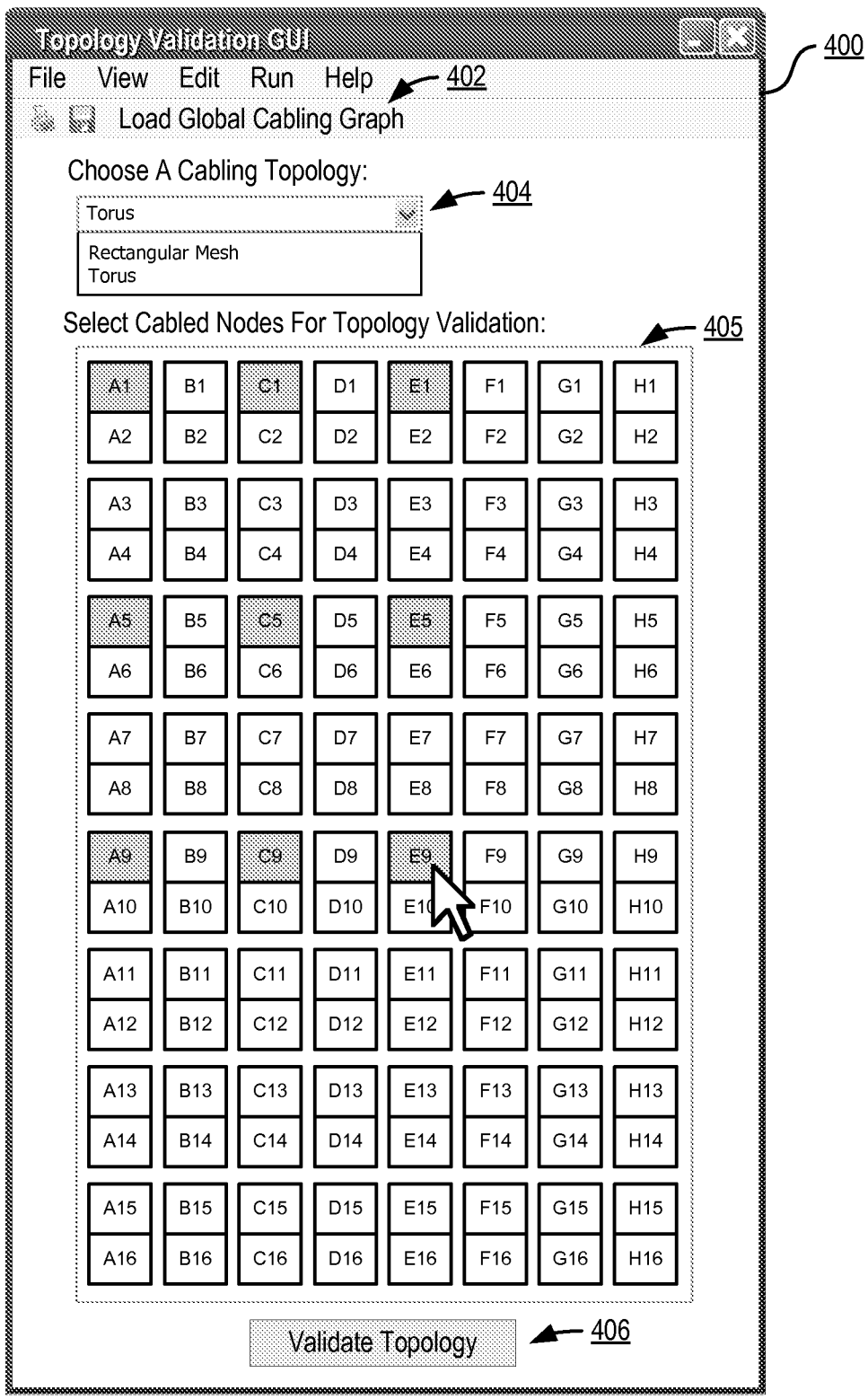
FIG. 4 sets forth a line drawing of a topology validation graphical user interface useful in validating a cabling topology in a distributed computing system according to embodiments of the present invention.

The topology validation GUI (400) of FIG. 4 includes a button (402) labeled 'Load Global Cabling Graph.' A user may operate the button (402) to load into computer memory a particular global cabling graph that models the entire cabling topology for a particular distributed computing system. The global cabling graph provide configuration information about a particular distributed computing system such as, for example, the number of cabled nodes in the distributed computing system, the configuration of the cables connecting the cabled nodes, the cabled nodes to which a particular cabled node is connected in each cabling dimension, and so on.

The topology validation GUI (400) of FIG. 4 also includes a drop-down box (404) for receiving a topology selection from a user of the particular cabling topology to validate against the user's selection of cabled nodes. Using the exemplary drop-down box (404), a topology validation module may receive a topology selection from a user for validating whether selected nodes form a rectangular mesh topology or a torus topology.

Upon loading the global cabling graph for a particular distributed computing system, the topology validation GUI (400) displays the cabled nodes for the distributed computing system in area (405) of the GUI (400). Using a mouse or other input device, the user may select one or more cabled nodes used to process the user's distributed software application. After selecting the cabled nodes in area (404), a user may operate the button (406) labeled 'Validate Topology' to validate whether the selected nodes form the topology specified in the drop-down box (404) according to embodiments of the present invention.

Figure 5:
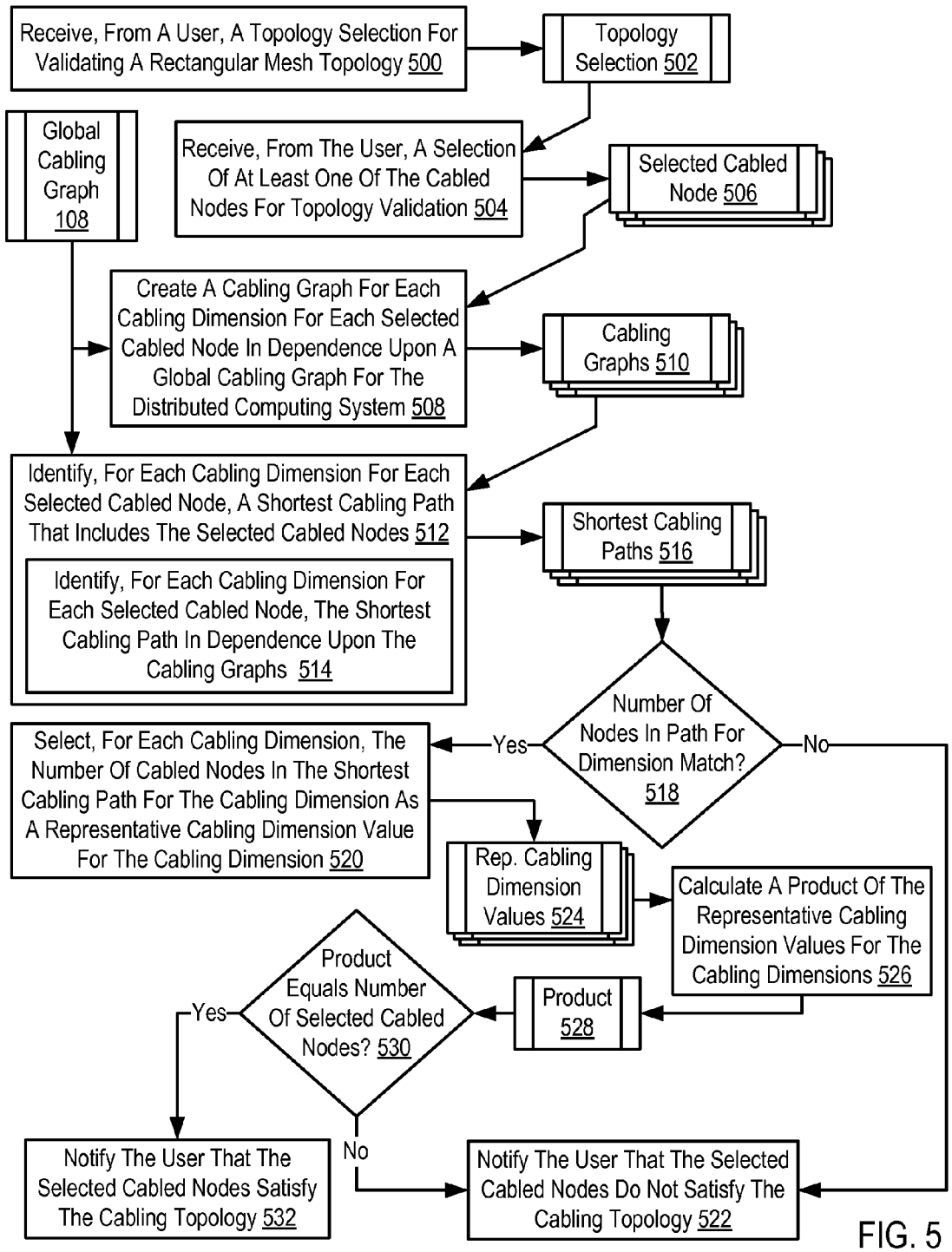
FIG. 5 sets forth a flow chart illustrating an exemplary method for validating a cabling topology in a distributed computing system according to embodiments of the present invention.

For further explanation, FIG. 5 sets forth a flow chart illustrating an exemplary method for validating a cabling topology in a distributed computing system according to embodiments of the present invention. The distributed computing system is comprised of a plurality of cabled nodes connected for data communications using a plurality of cables. Each cabled node of the distributed computing system is characterized by a plurality of cabling dimensions, and each cable corresponds to one of the cabling dimensions.

The method of FIG. 5 includes receiving (500), by a topology validation module from the user, a topology selection (502) for validating a rectangular mesh topology. The topology selection (502) represents the particular cabling topology among the cabled nodes selected by the user for processing the user's distributed software application. In the example of FIG. 5, the topology selection (502) represents a selection for a rectangular mesh topology. The topology validation module may receive (500) a topology selection (502) from the user for validating a rectangular mesh topology according to the method of FIG. 5 through a topology validation GUI such as, for example, the topology validation GUI illustrated above with reference to FIG. 4.

The method of FIG. 5 also includes receiving (504), in the topology validation module from a user, a selection (506) of at least one of the cabled nodes for topology validation. Such a selection (506) represents one or more of the cabled nodes selected by the user for processing the user's distributed software application. In the example of FIG. 5, the selected cabled nodes (506) received in the topology validation module from the user are implemented as a set of identifiers for the cabled nodes selected by the user. The topology validation module may receive (504) a selection (506) of at least one of the cabled nodes for topology validation from a user according to the method of FIG. 5 through a topology validation GUI such as, for example, the topology validation GUI illustrated above with reference to FIG. 4.

The method of FIG. 5 includes creating (508), by the topology validation module, a cabling graph (510) for each cabling dimension for each selected cabled node in dependence upon a global cabling graph (108) for the distributed computing system. As mentioned above, the global cabling graph (108) of FIG. 5 represents a data structure that models the cabling topology of the entire distributed computing system (100). The global cabling graph (108) of FIG. 1 may be implemented using tables of database, text files, markup language documents specified using the Graph Description Language ('GDL') or the extensible Graph Markup and Modeling Language ('XGMML'), and so on. For example, consider the following exemplary global cabling graph implemented as a markup language document specified using GDL:

```
graph: { //Global Cabling Graph
    node: {title: "A1"}
    node: {title: "A2"}
    node: {title: "A3"}
    ...
    node: {title: "H14"}
    node: {title: "H15"}
    node: {title: "H16"}
    edge: {source: "A2" target: "A3" dim: "X"}
    edge: {source: "A4" target: "A7" dim: "X"}
    edge: {source: "A8" target: "A11" dim: "X"}
    ...
    edge: {source: "A1" target: "E1" dim: "Y"}
    edge: {source: "E1" target: "G1" dim: "Y"}
    edge: {source: "G1" target: "C1" dim: "Y"}
    ...
    edge: {source: "A1" target: "A2" dim: "Z"}
    edge: {source: "A2" target: "B2" dim: "Z"}
    edge: {source: "B2" target: "B1" dim: "Z"}
    ...
}
```

The exemplary global cabling graph above fully specifies the cabling topology of the exemplary distributed computing system (100) of FIG. 1. Each cabled node (102) of the exemplary distributed computing system (100) is represented by a GDL 'node' element. For example, the GDL node element 'node: {title: "A1"}' specifies that the distributed computing system includes a cabled node having an identifier 'A1.' Each cable (104) of the exemplary distributed computing system (100) is represented by a GDL 'edge' element. For example, GDL element 'edge: {source: "A2" target: "A3" dim: "X"}' specifies that unidirectional cable connects cabled node 'A2' to cabled node 'A3' and that the specified cable corresponds to the 'X' cabling dimension. Each GDL 'node' element and GDL 'edge' element may be referred to as a graph entry. In other embodiments where the global cabling graph is implemented using tables of a database, each row may be considered a graph entry.

In the example of FIG. 5, each cabling graph (510) is a subset of the global cabling graph (108) and is specific to a particular cabling dimension and a particular selected cabled node (506). The topology validation module may create (508) a cabling graph (510) for each cabling dimension for each selected cabled node (506) according to the method of FIG. 5 by repeatedly selecting the graph entry for each cable of the particular cabling dimension connected to the selected cabled node or connected to another cabled node connected to a previously selected cable until all such graph entries have been selected from the global cabling graph (108). The topology validation module may then store the selected graph entries as the cabling graph (510) for the cabling dimension for the selected cabled node. The cabling graph (510) for each cabling dimension for each selected cabled node may be implemented in a manner similar to the global cabling graph (108) using, for example, tables of database, text files, markup language documents specified according to GDL or XGMML, and so on.

The method of FIG. 5 also includes identifying (512), by the topology validation module for each cabling dimension for each selected cabled node, a shortest cabling path (516) that includes the selected cabled nodes capable of connecting to the selected cabled node in the cabling dimension. A cabling path is the list of cabled nodes traversed by repeatedly following a single inbound cable into a cabled node and following a single outbound cable out of the cabled node until either an outbound cable is unavailable or the list cycles back around to the starting cabled node. The shortest cabling path (516) of FIG. 5 represents the cabling path having the fewest number of cabled nodes that includes the selected cabled nodes (506) capable of connecting to the selected cabled node in the cabling dimension.

Identifying (512), by the topology validation module for each cabling dimension for each selected cabled node, a shortest cabling path (516) according to the method of FIG. 5 includes identifying (514), for each cabling dimension for each selected cabled node, the shortest cabling path (516) that includes the selected cabled nodes in dependence upon the cabling graphs (510) for cabling dimensions for the selected cabled node. The topology validation module may identify (514) a shortest cabling path (516) for each cabling dimension for each selected cabled node in dependence upon the cabling graphs (510) according to the method of FIG. 5 by determining all of the selected cabled nodes capable of connecting to the selected cabled node in the cabling dimension using configuration data in the global cabling graph (108), repeatedly traversing the cabled nodes in the cabling graph (510) for the cabling dimension for the selected cabled node to find the number of cabled nodes of each cabling path for the cabling graph (510), and selecting the cabling path of the cabling graph (510) having the fewest number of cabled nodes and that includes the selected cabled nodes (506) capable of connecting to the selected cabled node in the cabling dimension. In the event that a cabling path does not exist for a particular selected node for a particular cabling dimension that includes the selected cabled nodes capable of connecting to the selected cabled node in the cabling dimension, the topology validation module may notify (522) the user that the selected cabled nodes (506) do not satisfy the cabling topology as discussed below.

The results of identifying (512) the shortest cabling path (516) for each cabling dimension for each selected cabled node may be stored in a table or other data structure as will occur to those of skill in the art. Consider, for example, a distributed computing system having three cabling dimensions X, Y, and Z. Further consider that a user selected eight of the available cabled nodes for processing the user's distributed software application. The results of identifying (514) the shortest cabling path (516) for each cabling dimension for each selected cabled node may be stored, for example, in the following table:

TABLE 1

NUMBER OF CABLED NODES
IN EACH SHORTEST CABLING PATH

| | SELECTED CABLED NODES | | | | | | | |
|---|---|---|---|---|---|---|---|---|
| DIM. | cn0 | cn1 | cn2 | cn3 | cn4 | cn5 | cn6 | cn7 |
| X | 2 | 2 | 2 | 2 | 2 | 2 | 2 | 2 |
| Y | 2 | 2 | 2 | 2 | 2 | 2 | 2 | 2 |
| Z | 2 | 2 | 2 | 2 | 2 | 2 | 2 | 2 |

The exemplary table 1 above stores the number of cabled nodes in the shortest cabling path for each cabling dimension for each selected node. In the exemplary table 1 above, each of the shortest cabling paths includes two cabled nodes.

The method of FIG. 5 includes determining (518), by the topology validation module for each cabling dimension, whether the number of cabled nodes in the shortest cabling path (516) for each selected cabled node match. The topology validation module may determine (518), for each cabling dimension, whether the number of cabled nodes in the shortest cabling path (516) for each selected cabled node match according to the method of FIG. 5 by comparing the number of cabled nodes in the shortest cabling path (516) for each selected cabled node for the cabling dimension. If the number of cabled nodes in the shortest cabling path (516) for each selected cabled node for the cabling dimension are all equal, then the number of cabled nodes in the shortest cabling path (516) for each selected cabled node for the cabling dimension match. If the number of cabled nodes in the shortest cabling path (516) for each selected cabled node for the cabling dimension are not all equal, then the number of cabled nodes in the shortest cabling path (516) for each selected cabled node for the cabling dimension do not match.

The method of FIG. 5 also includes notifying (522), by the topology validation module, the user that the selected cabled nodes (506) do not satisfy the cabling topology if, for each cabling dimension, the number of cabled nodes in the shortest cabling path (516) for each selected cabled node do not match. The topology validation module may notify (522) the user that the selected cabled nodes (506) do not satisfy the cabling topology according to the method of FIG. 5 by displaying a message to the user on a GUI that indicates that the selected cabled nodes (506) do not satisfy the selected cabling topology (502). At this point the user may optionally select a different cabling topology or select a different set of cabled node to use in processing the user's distributed software application.

The method of FIG. 5 includes selecting (520), by the topology validation module for each cabling dimension, the number of cabled nodes in the shortest cabling path (516) for the cabling dimension as a representative cabling dimension value (524) for the cabling dimension if, for each cabling dimension, the number of cabled nodes in the shortest cabling path (516) for each selected cabled node match. Consider again, for example, the results of the exemplary Table 1 above, in which each of the shortest cabling paths for each cabling dimension includes two cabled nodes. Selecting (520), by the topology validation module for each cabling dimension, the number of cabled nodes in the shortest cabling path (516) for the cabling dimension as a representative cabling dimension value (524) may yield the results illustrated in the exemplary table below:

TABLE 2

REPRESENTATIVE VALUES
FOR EACH CABLING DIMENSION

| | SELECTED CABLED NODES | | | | | | | | Rep. |
|---|---|---|---|---|---|---|---|---|---|
| DIM. | cn0 | cn1 | cn2 | Cn3 | cn4 | cn5 | cn6 | cn7 | Value |
| X | 2 | 2 | 2 | 2 | 2 | 2 | 2 | 2 | 2 |
| Y | 2 | 2 | 2 | 2 | 2 | 2 | 2 | 2 | 2 |
| Z | 2 | 2 | 2 | 2 | 2 | 2 | 2 | 2 | 2 |

The exemplary table 2 above illustrates a representative cabling dimension value (524) for each exemplary cabling dimension X, Y, and Z. Because the number of cabled nodes in the shortest cabling path for each of the selected cabled nodes for the X cabling dimension match having a value of '2,' the representative cabling dimension value for the X cabling dimension is '2.' Because the number of cabled nodes in the shortest cabling path for each of the selected cabled nodes for the Y cabling dimension match having a value of '2,' the representative cabling dimension value for the Y cabling dimension is '2.' Similarly, the representative cabling dimension value for the Z cabling dimension is '2' because the number of cabled nodes in the shortest cabling path for each of the selected cabled nodes for the Z cabling dimension match having a value of '2.'

The method of FIG. 5 also includes calculating (526), by the topology validation module, a product (528) of the representative cabling dimension values (524) for the cabling dimensions if, for each cabling dimension, the number of cabled nodes in the shortest cabling path (516) for each selected cabled node match. Consider again, for example, the results of the exemplary Table 2 above, in which the representative cabling value for each cabling dimension is a value of '2.' Calculating (526), by the topology validation module, a product (528) of the representative cabling dimension values (524) for the cabling dimensions may yield the results illustrated in the exemplary table below:

TABLE 3

PRODUCT OF THE REPRESENTATIVE VALUES FOR EACH CABLING DIMENSION

| DIM. | SELECTED CABLED NODES ||||||||  Rep. Value |
|---|---|---|---|---|---|---|---|---|---|
|      | cn0 | cn1 | cn2 | Cn3 | cn4 | cn5 | cn6 | cn7 | |
| X | 2 | 2 | 2 | 2 | 2 | 2 | 2 | 2 | 2 |
| Y | 2 | 2 | 2 | 2 | 2 | 2 | 2 | 2 | 2 |
| Z | 2 | 2 | 2 | 2 | 2 | 2 | 2 | 2 | 2 |
|   |   |   |   |   |   |   |   | Product: | 8 |

The exemplary table 3 above illustrates the product of the representative cabling dimension values (524) for the exemplary cabling dimensions X, Y, and Z. Because the representative cabling dimension value for the X cabling dimension is '2,' the representative cabling dimension value for the Y cabling dimension is '2,' and the representative cabling dimension value for the Z cabling dimension is '2,' the product of the representative cabling dimension values for the cabling dimensions X, Y, and Z is '8.'

The method of FIG. 5 also includes determining (530), by the topology validation module, whether the product (528) of the representative cabling dimension values (524) for the cabling dimensions equals the number of selected cabled nodes (506) for topology validation if, for each cabling dimension, the number of cabled nodes in the shortest cabling path (516) for each selected cabled node match. The topology validation module may determine (530) whether the product (528) of the representative cabling dimension values (524) for the cabling dimensions equals the number of selected cabled nodes (506) for topology validation according to the method of FIG. 5 by comparing the product (528) to the number of selected cabled nodes (506) for topology validation. If the product (528) matches the number of selected cabled nodes (506), then the product (528) of the representative cabling dimension values (524) equals the number of selected cabled nodes (506). If the product (528) does not match the number of selected cabled nodes (506), then the product (528) of the representative cabling dimension values (524) does not equal the number of selected cabled nodes (506).

The method of FIG. 5 includes notifying (532), by the topology validation module, the user that the selected cabled nodes (506) satisfy the cabling topology if the product (528) of the representative cabling dimension values (524) for the cabling dimensions equals the number of selected cabled nodes (506) for topology validation. The topology validation module may notify (532) the user that the selected cabled nodes (506) satisfy the cabling topology according to the method of FIG. 5 by displaying a message to the user on a GUI that indicates that the selected cabled nodes (506) satisfy the selected cabling topology (502). At this point the user may optionally choose to installed the user's distributed software application on the computing devices of the selected cabled nodes with confidence that the selected cabled node form the desire cabling topology capable of performing message passing for the user's distributed software application.

The method of FIG. 5 includes notifying (522), by the topology validation module, the user that the selected cabled nodes (506) do not satisfy the cabling topology if the product (528) of the representative cabling dimension values (524) for the cabling dimensions does not equal the number of selected cabled nodes (506) for topology validation. The topology validation module may notify (522) the user that the selected cabled nodes (506) do not satisfy the cabling topology according to the method of FIG. 5 by displaying a message to the user on a GUI that indicates that the selected cabled nodes (506) do not satisfy the selected cabling topology (502). At this point the user may optionally select a different cabling topology or select a different set of cabled node to use in processing the user's distributed software application.

Figure 6:
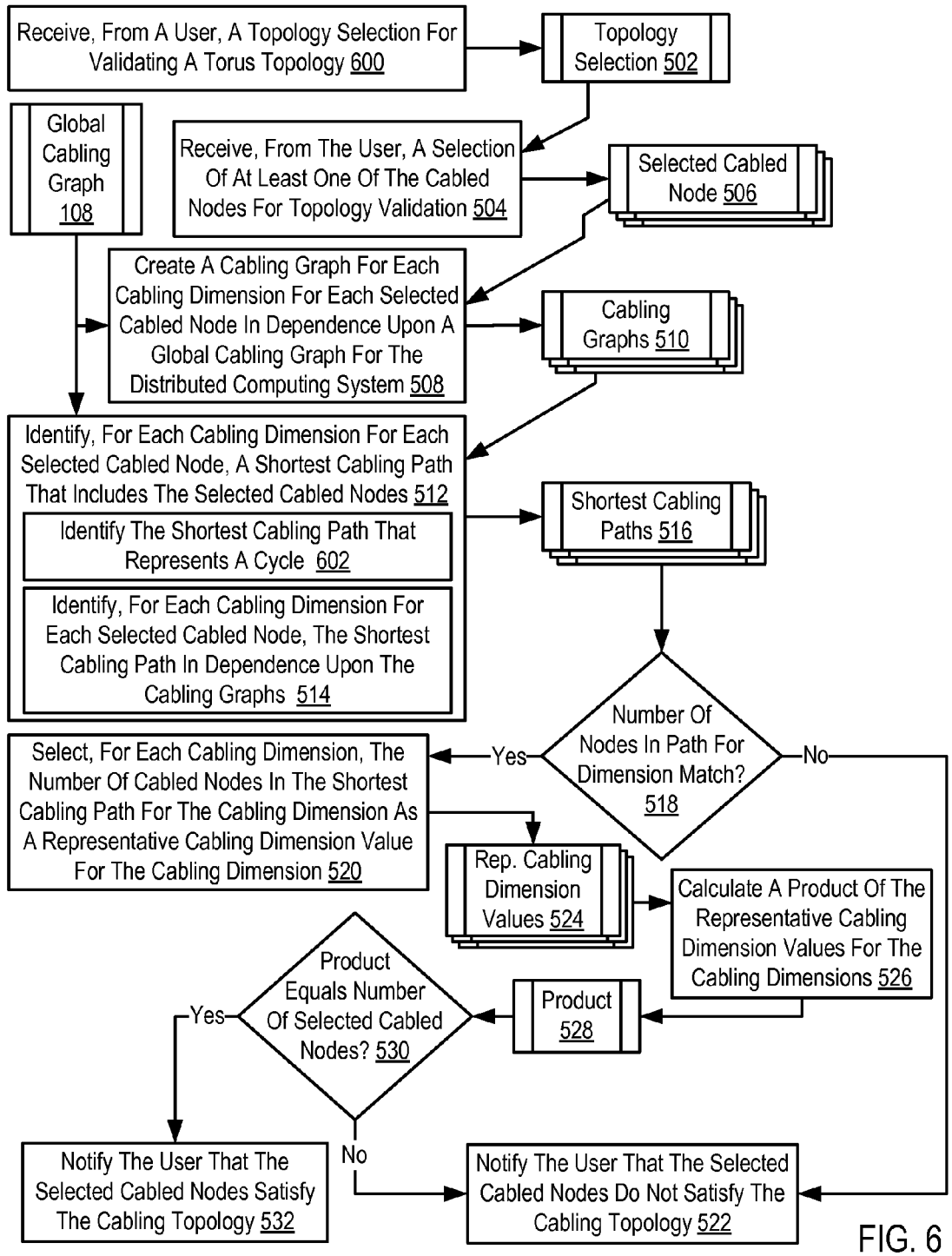
FIG. 6 sets forth a flow chart illustrating a further exemplary method for validating a cabling topology in a distributed computing system according to embodiments of the present invention.

The description above with reference to FIG. 5 is directed toward an embodiment of validating a cabling topology in a distributed computing system according to the present invention when a topology validation module receives a topology selection from the user for validating a rectangular mesh topology. As mention above, however, a user may also desire to validate a torus topology against a selection of cabled nodes. Validating a torus topology is similar to validating a rectangular mesh topology with the exception that wrap-around cables must exists for the cabled nodes on the outer edges of the mesh to connect cabled nodes on opposites sides of the mesh. For further explanation, therefore, FIG. 6 sets forth a flow chart illustrating a further exemplary method for validating a cabling topology in a distributed computing system according to embodiments of the present invention that includes receiving (600), by the topology validation module from the user, a topology selection (502) for validating a torus topology. As mentioned above, the topology selection (502) of FIG. 6 represents the particular cabling topology among the cabled nodes selected by the user for processing the user's distributed software application. In the example of FIG. 6 specifically, the topology selection (502) represents a selection for a torus topology. The topology validation module may receive (600) a topology selection (502) from the user for validating a torus topology according to the method of FIG. 6 through a topology validation GUI such as, for example, the topology validation GUI illustrated above with reference to FIG. 4.

The remainder of the method of FIG. 6 is substantially similar to the method of FIG. 5. That is, in the method of FIG. 6, a topology validation module receives (504) a selection (506) from a user of at least one of the cabled nodes for topology validation. The topology validation module creates (508) a cabling graph (510) for each cabling dimension for each selected cabled node in dependence upon a global cabling graph (108) for the distributed computing system. The topology validation module identifies (512), for each cabling dimension for each selected cabled node, a shortest cabling path (516) that includes the selected cabled nodes (506) capable of connecting to the selected cabled node in the cabling dimension. The topology validation module identifies (512) the shortest cabling path (516) by identifying (514), for each cabling dimension for each selected cabled node (506), the shortest cabling path (516) in dependence upon the cabling graphs for cabling dimensions for the selected cabled node (506). The topology validation module determines (518), for each cabling dimension, whether the number of cabled nodes in the shortest cabling path (516) for each selected cabled node (506) match. If, for each cabling dimension, the number of cabled nodes in the shortest cabling path (516) for each selected cabled node (506) does not match, the topology validation module notifies (522) the user that the selected cabled nodes (506) do not satisfy the selected cabling topology (502). If, for each cabling dimension, the number of cabled nodes in the shortest cabling path (516) for each selected cabled node (506) match, the topology validation module selects (520), for each cabling dimension, the number of cabled nodes in the shortest cabling path (516) for the cabling dimension as a representative cabling dimension value (524) for the cabling dimension. The topology validation module calculates (526) a product (528) of the representative cabling dimension values (524) for the cabling dimensions. The topology validation module determines (530) whether the product (528) of the representative cabling dimension values (524) for the cabling dimensions equals the number of selected cabled nodes (506) for topology validation. The topology validation module notifies (532) the user that the selected cabled nodes (506) satisfy the selected cabling topology (502) if the product (528) of the representative cabling dimension values (524) for the cabling dimensions equals the number of selected cabled nodes (506) for topology validation. If the product (528) of the representative cabling dimension values (524) for the cabling dimensions does not equal the number of selected cabled nodes (506) for topology validation, the topology validation module notifies (522) the user that the selected cabled nodes (506) do not satisfy the cabling topology.

The method of FIG. 6 differs from the method of FIG. 5, however, in that identifying (512), by the topology validation module for each cabling dimension for each selected cabled node, a shortest cabling path (516) that includes the selected cabled nodes capable of connecting to the selected cabled node in the cabling dimension includes identifying (602) the shortest cabling path (516) that represents a cycle. A cycle indicates that the cabling path forms a loop. Readers will recall that a cabling path is the list of cabled nodes traversed by repeatedly following a single inbound cable into a cabled node and following a single outbound cable out of the cabled node until either an outbound cable is unavailable or the list cycles back around to the starting cabled node. Because a cycle indicates that the cabling path forms a loop, a cabling path that represents a cycle is the list of cabled nodes traversed by repeatedly following a single inbound cable into a cabled node and following a single outbound cable out of the cabled node until the list cycles back around to the starting cabled node. The shortest cabling path (516) of FIG. 6, therefore, represents the cabling path that represents a cycle and has the fewest number of cabled nodes that includes the selected cabled nodes (506) capable of connecting to the selected cabled node in the cabling dimension. By adding the requirement that the shortest cabling path represent a cycle, the topology validation module advantageously is able to validate a torus topology in a distributed computing system according to embodiments of the present invention using an algorithm similar to the algorithm for validating a rectangular mesh.

Readers will recall from above that the distributed computing system for which a cabling topology is validated according to embodiments of the present invention may be implemented as a parallel computer. For further explanation, FIG. 7 sets forth a system diagram illustrating an exemplary distributed computing system implemented as a parallel computer (700) that is useful in validating a cabling topology in a distributed computing system according to embodiments of the present invention. A parallel computer is a collection of computing devices operating together to process a parallel algorithm. A parallel algorithm can be split up to be executed a piece at a time on many different computing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple computing devices that execute the individual pieces of a parallel algorithm are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Figure 7:
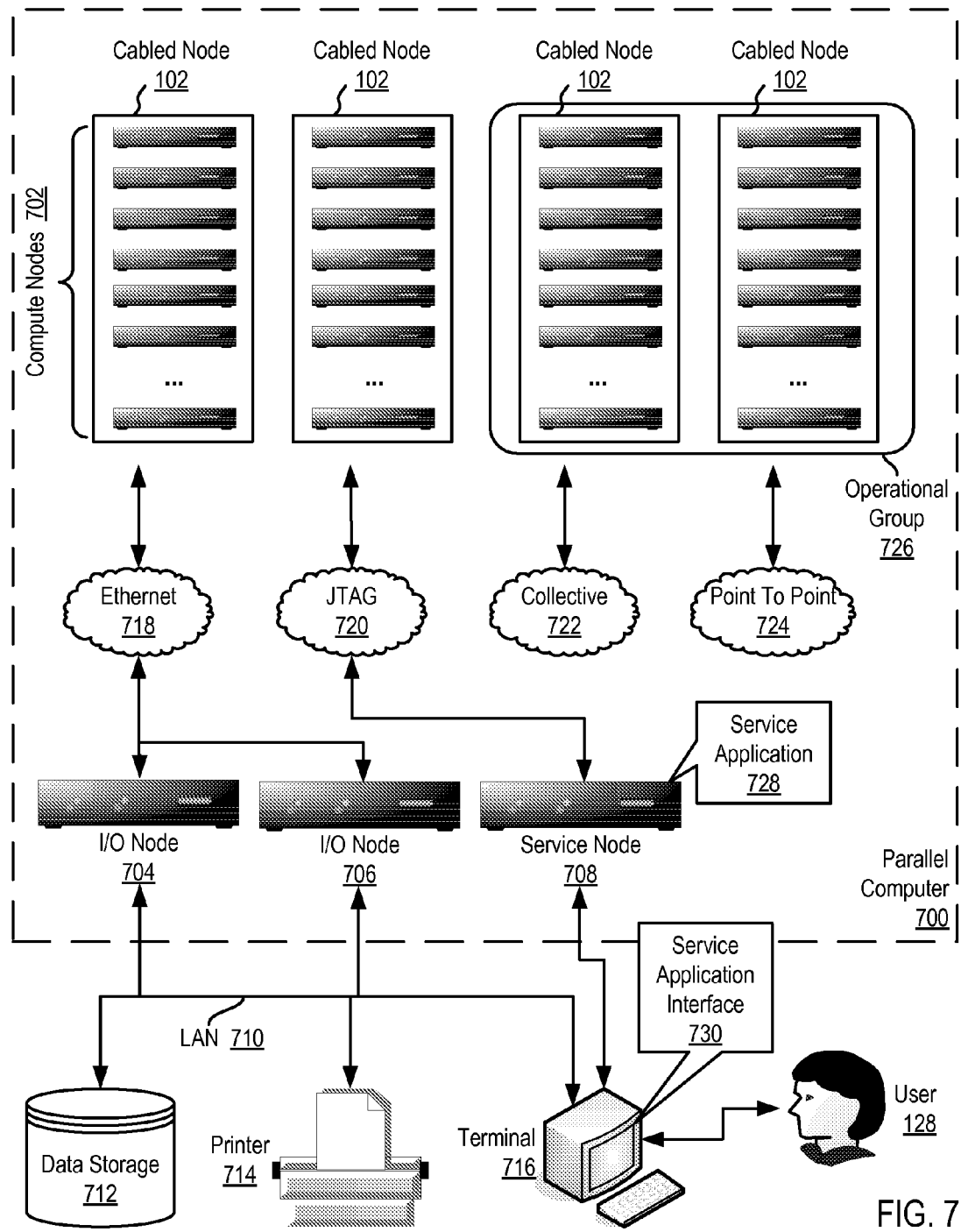
FIG. 7 sets forth a system diagram illustrating an exemplary distributed computing system implemented as a parallel computer that is useful in validating a cabling topology in a distributed computing system according to embodiments of the present invention.

The system of FIG. 7 includes a parallel computer (700), non-volatile memory for the computer in the form of data storage device (712), an output device for the computer in the form of printer (714), and an input/output device for the computer in the form of computer terminal (716). Parallel computer (700) in the example of FIG. 7 includes a plurality of cabled nodes (102). Each cabled node includes a plurality of compute nodes (702).

The compute nodes (702) are coupled for data communications by several independent data communications networks including a high speed Ethernet network (718), a Joint Test Action Group ('JTAG') network (720), a tree network (722) which is optimized for collective operations, and a torus network (724) which is optimized point to point operations. Tree network (722) is a data communications network that includes data communications links connected to the compute nodes so as to organize the compute nodes as a tree. Each data communications network is implemented with data communications links among the compute nodes (702). The data communications links provide data communications for parallel operations among the compute nodes of the parallel computer.

In addition, the compute nodes (702) of parallel computer are organized into at least one operational group (726) of compute nodes for collective parallel operations on parallel computer (700). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (700) or a subset all the compute nodes. Collective operations are often built around point to point operations. A collective operation requires that all processes on all compute nodes within an operational group call the same collective operation with matching arguments. A 'broadcast' is an example of a collective operations for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for validating a cabling topology in a distributed computing system according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

In addition to compute nodes, the parallel computer (700) includes input/output ('I/O') nodes (704, 706) coupled to compute nodes (702) through one of the data communications networks (718). The I/O nodes (704, 706) provide I/O services between compute nodes (702) and I/O devices (712, 714, 716). I/O nodes (704, 706) are connected for data communications I/O devices (712, 714, 716) through local area network ('LAN') (710). The parallel computer (700) also includes a service node (708) coupled to the compute nodes through one of the networks (720). Service node (708) provides service common to pluralities of compute nodes, loading programs into the compute nodes, starting program execution on the compute nodes, retrieving results of program operations on the computer nodes, and so on. Service node (708) runs a service application (728) and communicates with users (128) through a service application interface (730) that runs on computer terminal (716).

The arrangement of nodes, networks, and I/O devices making up the exemplary system illustrated in FIG. 7 are for explanation only, not for limitation of the present invention. Data processing systems useful in validating a cabling topology in a distributed computing system according to embodiments of the present invention may include additional nodes, networks, devices, and architectures, not shown in FIG. 7, as will occur to those of skill in the art. In addition to Ethernet and JTAG, networks in such data processing systems may support many data communications protocols including for example Transmission Control Protocol ('TCP'), Internet Protocol ('IP'), and others as will occur to those of skill in the art. Various embodiments of the present invention may be implemented on a variety of hardware platforms in addition to those illustrated in FIG. 7.

As mentioned above, a parallel computer includes a plurality of cabled nodes, and each cabled node, in turn, includes a plurality of compute nodes. Each compute node is in turn itself a kind of computer composed of one or more computer processors, its own computer memory, and its own input/output adapters. For further explanation, therefore, FIG. 8 sets forth a block diagram of an exemplary compute node useful in a parallel computer implementing a distributed computer useful in validating a cabling topology in a distributed computing system according to embodiments of the present invention. The compute node (702) of FIG. 8 includes at least one computer processor (164) as well as random access memory ('RAM') (156). Processor (164) is connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in validating a cabling topology in a distributed computing system according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be improved for validating a cabling topology in a distributed computing system according to embodiments of the present invention include the 'Message Passing Interface' ('MPI') library and the 'Parallel Virtual Machine' ('PVM') library. However it is developed, the parallel communications routines of parallel communication library (160) are improved to execute an allgather operation according to embodiments of the present invention by configuring on each compute node in an operational group of compute nodes a memory buffer with contribution data for an allreduce operation at a rank-dependent position in each memory buffer and zeros in all other positions in each memory buffer and executing on the compute nodes in the operational group, with the entire contents of each memory buffer, an allreduce operation with a bitwise OR function.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (702) of FIG. 8, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 8:
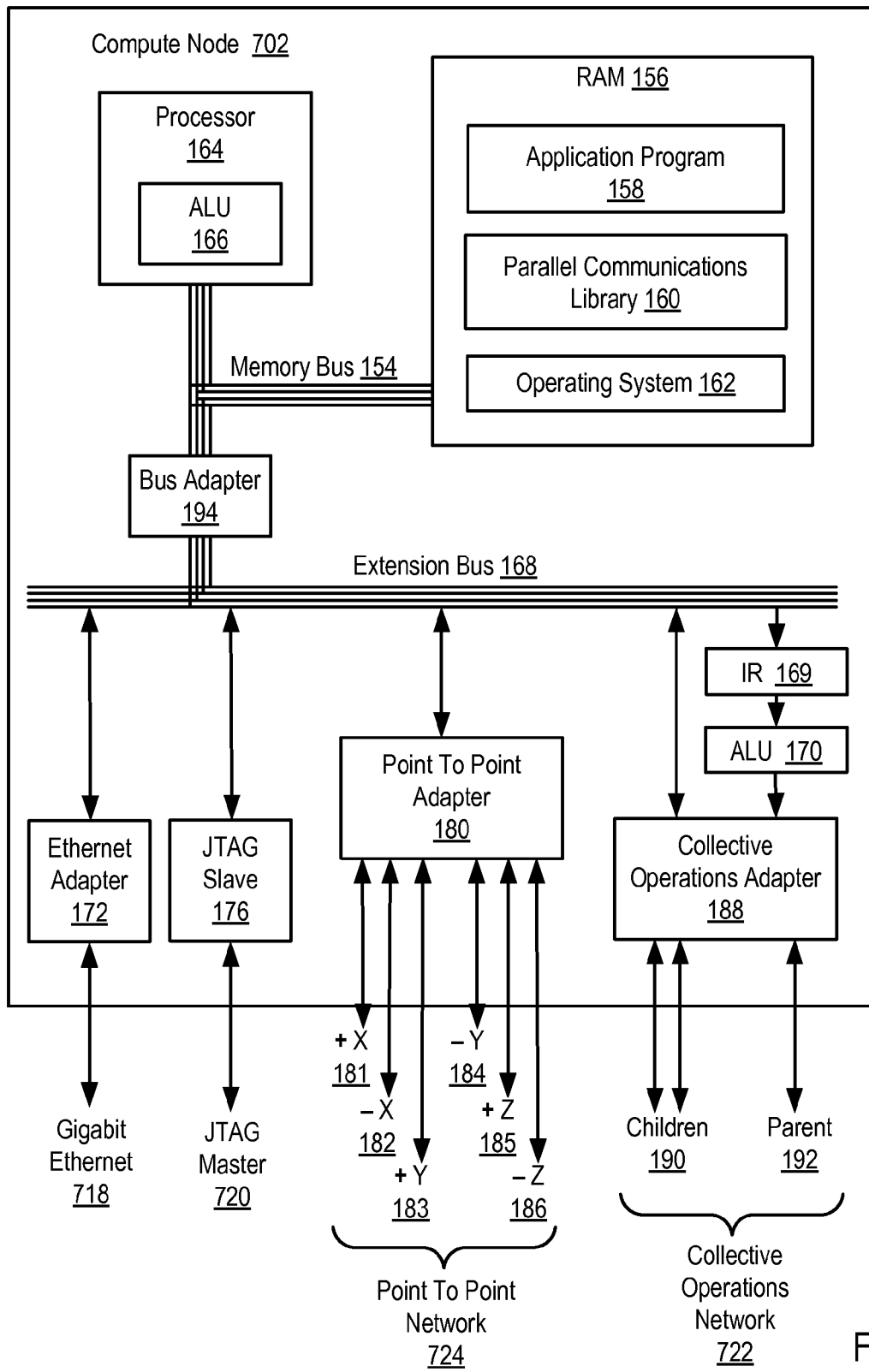
FIG. 8 sets forth a block diagram of an exemplary compute node useful in a parallel computer implementing a distributed computer useful in validating a cabling topology in a distributed computing system according to embodiments of the present invention.

The exemplary compute node (702) of FIG. 8 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that execute allgather operations according to embodiments of the present invention include modems for wired communications, Ethernet (IEEE 802.3) adapters for wired network communications, and 802.11b adapters for wireless network communications.

The data communications adapters in the example of FIG. 8 include a Gigabit Ethernet adapter (172) that couples example compute node (702) for data communications to a Gigabit Ethernet (718). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 8 includes a JTAG Slave circuit (176) that couples example compute node (702) for data communications to a JTAG Master circuit (720). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 8 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (702) for use in executing allgather operations according to embodiments of the present invention.

The data communications adapters in the example of FIG. 8 includes a Point To Point Adapter (180) that couples example compute node (702) for data communications to a network (724) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 8 includes a Collective Operations Adapter (188) that couples example compute node (702) for data communications to a network (722) that is optimal for collective message passing operations such as, for example, a network configured as a binary tree. Collective Operations Adapter (188) provides data communications through three bidirectional links: two to children nodes (190) and one to a parent node (192).

Example compute node (702) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Exemplary embodiments of the present invention are described largely in the context of a fully functional computer system for validating a cabling topology in a distributed computing system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of validating a three-dimensional cabling topology in a distributed computing system, the distributed computing system comprised of a plurality of cabled nodes connected for data communications using a plurality of cables, each cabled node of the distributed computing system characterized by a plurality of cabling dimensions, the plurality of cabling dimensions including at least a first cabling dimension, a second cabling dimension, and a third cabling dimension, each cable corresponding to one of the cabling dimensions, the method comprising:

receiving, in a topology validation module from a user, a selection of at least one of the cabled nodes for topology validation;

identifying, by the topology validation module for the first cabling dimension for each of the cabled node selected, a shortest cabling path in the first cabling dimension beginning at the selected cable node and including any other of the selected cabled nodes capable of connecting to the selected cabled node in the first cabling dimension, wherein each shortest cabling path in the first cabling dimension ends at one of a cabled node having no outbound cable in the first cabling dimension or at the selected cabled node itself;

comparing, to each other and by the topology validation module for the first cabling dimension a number of cabled nodes in the shortest cabling path in the first cabling dimension for each of the selected cabled nodes;

determining, based on the comparing for the first cabling dimension and by the topology validation module for the first cabling dimension, that the number of cabled nodes in the shortest cabling path in the first cabling dimension for each of the selected cabled nodes match;

identifying, by the topology validation module for the second cabling dimension for each of the cabled node selected, a shortest cabling path in the second cabling dimension beginning at the selected cable node and including any other of the selected cabled nodes capable of connecting to the selected cabled node in the second cabling dimension, wherein each shortest cabling path in the second cabling dimension ends at one of a cabled node having no outbound cable in the second cabling dimension or at the selected cabled node itself;

comparing, to each other and by the topology validation module for the second cabling dimension a number of cabled nodes in the shortest cabling path in the second cabling dimension for each of the selected cabled nodes;

determining, based on the comparing for the second cabling dimension and by the topology validation module for the second cabling dimension, that the number of cabled nodes in the shortest cabling path in the second cabling dimension for each of the selected cabled nodes match;

identifying, by the topology validation module for the third cabling dimension for each of the cabled node selected, a shortest cabling path in the third cabling dimension beginning at the selected cable node and including any other of the selected cabled nodes capable of connecting to the selected cabled node in the third cabling dimension, wherein each shortest cabling path in the third cabling dimension ends at one of a cabled node having no outbound cable in the third cabling dimension or at the selected cabled node itself;

comparing, to each other and by the topology validation module for the third cabling dimension a number of cabled nodes in the shortest cabling path in the third cabling dimension for each of the selected cabled nodes;

determining, based on the comparing for the third cabling dimension and by the topology validation module for the third cabling dimension, that the number of cabled nodes in the shortest cabling path in the third cabling dimension for each of the selected cabled nodes match;

selecting, by the topology validation module for each of the first cabling dimension, the second cabling dimension, and the third cabling dimension, the number of cabled nodes in the shortest cabling path for the cabling dimension as a representative cabling dimension value for the cabling dimension;

calculating, by the topology validation module, a product of the representative cabling dimension values for the cabling dimensions; and determining, by the topology validation module, whether the product of the representative cabling dimension values for the cabling dimensions equals a number of the cabled nodes selected for topology validation.

2. An apparatus for validating a three-dimensional cabling topology in a distributed computing system, the distributed computing system comprised of a plurality of cabled nodes connected for data communications using a plurality of cables, each cabled node of the distributed computing system characterized by a plurality of cabling dimensions, the plurality of cabling dimensions including at least a first cabling dimension, a second cabling dimension, and a third cabling dimension, each cable corresponding to one of the plurality of cabling dimensions, the apparatus comprising a computer processor and a computer memory operatively coupled to the computer processor, the computer memory having disposed within it computer program instructions capable of:

receiving, in a topology validation module from a user, a selection of at least one of the cabled nodes for topology validation;

identifying, by the topology validation module for the first cabling dimension for each of the cabled node selected, a shortest cabling path in the first cabling dimension beginning at the selected cable node and including any other of the selected cabled nodes capable of connecting to the selected cabled node in the first cabling dimension, wherein each shortest cabling path in the first cabling dimension ends at one of a cabled node having no outbound cable in the first cabling dimension or at the selected cabled node itself;

comparing, to each other and by the topology validation module for the first cabling dimension a number of cabled nodes in the shortest cabling path in the first cabling dimension for each of the selected cabled nodes;

determining, based on the comparing for the first cabling dimension and by the topology validation module for the first cabling dimension, that the number of cabled nodes in the shortest cabling path in the first cabling dimension for each of the selected cabled nodes match;

identifying, by the topology validation module for the second cabling dimension for each of the cabled node selected, a shortest cabling path in the second cabling dimension beginning at the selected cable node and including any other of the selected cabled nodes capable of connecting to the selected cabled node in the second cabling dimension, wherein each shortest cabling path in the second cabling dimension ends at one of a cabled node having no outbound cable in the second cabling dimension or at the selected cabled node itself;

comparing, to each other and by the topology validation module for the second cabling dimension a number of cabled nodes in the shortest cabling path in the second cabling dimension for each of the selected cabled nodes;

determining, based on the comparing for the second cabling dimension and by the topology validation module for the second cabling dimension, that the number of cabled nodes in the shortest cabling path in the second cabling dimension for each of the selected cabled nodes match;

identifying, by the topology validation module for the third cabling dimension for each of the cabled node selected, a shortest cabling path in the third cabling dimension beginning at the selected cable node and including any other of the selected cabled nodes capable of connecting to the selected cabled node in the third cabling dimension, wherein each shortest cabling path in the third cabling dimension ends at one of a cabled node having no outbound cable in the third cabling dimension or at the selected cabled node itself;

comparing, to each other and by the topology validation module for the third cabling dimension a number of cabled nodes in the shortest cabling path in the third cabling dimension for each of the selected cabled nodes;

determining, based on the comparing for the third cabling dimension and by the topology validation module for the third cabling dimension, that the number of cabled nodes in the shortest cabling path in the third cabling dimension for each of the selected cabled nodes match;

selecting, by the topology validation module for each of the first cabling dimension, the second cabling dimension, and the third cabling dimension, the number of cabled nodes in the shortest cabling path for the cabling dimension as a representative cabling dimension value for the cabling dimension;

calculating, by the topology validation module, a product of the representative cabling dimension values for the cabling dimensions; and determining, by the topology validation module, whether the product of the representative cabling dimension values for the cabling dimensions equals a number of the cabled nodes selected for topology validation.

3. The apparatus of claim 2:
wherein the determining, by the topology validation module, whether the product of the representative cabling dimension values for the cabling dimensions equals a number of the cabled nodes selected for topology validation comprises determining that the product of the representative cabling dimension values for the cabling dimensions does equal the number of the cabled nodes selected for topology validation, and wherein the number of cabled nodes in the shortest cabling path for the first cabling dimension is less than the number of cabled nodes in the shortest cabling path for the second cabling dimension.

4. The apparatus of claim 2, wherein the determining, by the topology validation module, whether the product of the representative cabling dimension values for the cabling dimensions equals a number of the cabled nodes selected for topology validation comprises determining that the product of the representative cabling dimension values for the cabling dimensions does not equal the number of the cabled nodes selected for topology validation.

5. The apparatus of claim 2, wherein the calculating, by the topology validation module, a product of the representative cabling dimension values for the cabling dimensions comprises multiplying the number of cabled nodes in the shortest cabling path for the first cabling dimension by the number of cabled nodes in the shortest cabling path for the second cabling dimension and by the number of cabled nodes in the shortest cabling path for the third cabling dimension.

6. The apparatus of claim 2, wherein the computer memory also has disposed within it computer program instructions capable of notifying, by the topology validation module, the user that the selected cabled nodes satisfy the cabling topology if the product of the representative cabling dimension values for the cabling dimensions equals the number of selected cabled nodes for topology validation.

7. The apparatus of claim 2, wherein:
the distributed computing system is a parallel computer; and
each cabled node further comprises a plurality of compute nodes.

8. A computer program product for validating a three-dimensional cabling topology in a distributed computing system, the distributed computing system comprised of a plurality of cabled nodes connected for data communications using a plurality of cables, each cabled node of the distributed computing system characterized by a plurality of cabling dimensions, the plurality of cabling dimensions including at least a first cabling dimension, a second cabling dimension, and a third cabling dimension, each cable corresponding to one of the cabling dimensions, the computer program product disposed upon a non-transitory recordable medium, the computer program product comprising computer program instructions capable of:

receiving, in a topology validation module from a user, a selection of at least one of the cabled nodes for topology validation;

identifying, by the topology validation module for the first cabling dimension for each of the cabled node selected, a shortest cabling path in the first cabling dimension beginning at the selected cable node and including any other of the selected cabled nodes capable of connecting to the selected cabled node in the first cabling dimension, wherein each shortest cabling path in the first cabling dimension ends at one of a cabled node having no outbound cable in the first cabling dimension or at the selected cabled node itself;

comparing, to each other and by the topology validation module for the first cabling dimension a number of cabled nodes in the shortest cabling path in the first cabling dimension for each of the selected cabled nodes;

determining, based on the comparing for the first cabling dimension and by the topology validation module for the first cabling dimension, that the number of cabled nodes in the shortest cabling path in the first cabling dimension for each of the selected cabled nodes match;

identifying, by the topology validation module for the second cabling dimension for each of the cabled node selected, a shortest cabling path in the second cabling dimension beginning at the selected cable node and including any other of the selected cabled nodes capable of connecting to the selected cabled node in the second cabling dimension, wherein each shortest cabling path in the second cabling dimension ends at one of a cabled node having no outbound cable in the second cabling dimension or at the selected cabled node itself;

comparing, to each other and by the topology validation module for the second cabling dimension a number of cabled nodes in the shortest cabling path in the second cabling dimension for each of the selected cabled nodes;

determining, based on the comparing for the second cabling dimension and by the topology validation module for the second cabling dimension, that the number of cabled nodes in the shortest cabling path in the second cabling dimension for each of the selected cabled nodes match;

identifying, by the topology validation module for the third cabling dimension for each of the cabled node selected, a shortest cabling path in the third cabling dimension beginning at the selected cable node and including any other of the selected cabled nodes capable of connecting to the selected cabled node in the third cabling dimension, wherein each shortest cabling path in the third cabling dimension ends at one of a cabled node having no outbound cable in the third cabling dimension or at the selected cabled node itself;

comparing, to each other and by the topology validation module for the third cabling dimension a number of cabled nodes in the shortest cabling path in the third cabling dimension for each of the selected cabled nodes;

determining, based on the comparing for the third cabling dimension and by the topology validation module for the third cabling dimension, that the number of cabled nodes in the shortest cabling path in the third cabling dimension for each of the selected cabled nodes match;

selecting, by the topology validation module for each of the first cabling dimension, the second cabling dimension, and the third cabling dimension, the number of cabled nodes in the shortest cabling path for the cabling dimension as a representative cabling dimension value for the cabling dimension;

calculating, by the topology validation module, a product of the representative cabling dimension values for the cabling dimensions; and determining, by the topology validation module, whether the product of the representative cabling dimension values for the cabling dimensions equals a number of the cabled nodes selected for topology validation.

9. The method of claim 1:
wherein the determining, by the topology validation module, whether the product of the representative cabling dimension values for the cabling dimensions equals a number of the cabled nodes selected for topology validation comprises determining that the product of the representative cabling dimension values for the cabling dimensions does equal the number of the cabled nodes selected for topology validation, and wherein the number of cabled nodes in the shortest cabling path for the first cabling dimension is less than the number of cabled nodes in the shortest cabling path for the second cabling dimension.

10. The method of claim 1, wherein the determining, by the topology validation module, whether the product of the representative cabling dimension values for the cabling dimensions equals a number of the cabled nodes selected for topology validation comprises determining that the product of the representative cabling dimension values for the cabling dimensions does not equal the number of the cabled nodes selected for topology validation.

11. The method of claim 1, wherein the calculating, by the topology validation module, a product of the representative cabling dimension values for the cabling dimensions comprises multiplying the number of cabled nodes in the shortest cabling path for the first cabling dimension by the number of cabled nodes in the shortest cabling path for the second cabling dimension and by the number of cabled nodes in the shortest cabling path for the third cabling dimension.

12. The method of claim 1, wherein the method further comprises:
notifying, by the topology validation module, the user that the selected cabled nodes satisfy the cabling topology if the product of the representative cabling dimension values for the cabling dimensions equals the number of selected cabled nodes for topology validation.

13. The method of claim 1, wherein:
the distributed computing system is a parallel computer; and
each cabled node further comprises a plurality of compute nodes.

14. The computer program product of claim 8:
wherein the determining, by the topology validation module, whether the product of the representative cabling dimension values for the cabling dimensions equals a number of the cabled nodes selected for topology validation comprises determining that the product of the representative cabling dimension values for the cabling dimensions does equal the number of the cabled nodes selected for topology validation, and wherein the number of cabled nodes in the shortest cabling path for the first cabling dimension is less than the number of cabled nodes in the shortest cabling path for the second cabling dimension.

15. The computer program product of claim 8, wherein the determining, by the topology validation module, whether the product of the representative cabling dimension values for the cabling dimensions equals a number of the cabled nodes selected for topology validation comprises determining that the product of the representative cabling dimension values for the cabling dimensions does not equal the number of the cabled nodes selected for topology validation.

16. The computer program product of claim 8, wherein the calculating, by the topology validation module, a product of the representative cabling dimension values for the cabling dimensions comprises multiplying the number of cabled nodes in the shortest cabling path for the first cabling dimension by the number of cabled nodes in the shortest cabling path for the second cabling dimension and by the number of cabled nodes in the shortest cabling path for the third cabling dimension.

17. The computer program product of claim 8, wherein the computer program instructions are further capable of:
notifying, by the topology validation module, the user that the selected cabled nodes satisfy the cabling topology if the product of the representative cabling dimension values for the cabling dimensions equals the number of selected cabled nodes for topology validation.

18. The computer program product of claim 8, wherein:
the distributed computing system is a parallel computer; and
each cabled node further comprises a plurality of compute nodes.

* * * * *